United States Patent
Choe et al.

(10) Patent No.: US 11,799,152 B2
(45) Date of Patent: Oct. 24, 2023

(54) EVALUATION OF CELL-LEVEL HEAT GENERATION IN BATTERY ELECTRIC SYSTEM USING DIRECT-TO-AIR HEAT PUMP

(71) Applicants: GM GLOBAL TECHNOLOGY OPERATIONS LLC, Detroit, MI (US); Song-Yul Choe, Auburn, AL (US); Yang Hu, Placentia, CA (US)

(72) Inventors: Song-Yul Choe, Auburn, AL (US); Yang Hu, Placentia, CA (US); Taylor R. Garrick, Royal Oak, MI (US)

(73) Assignees: GM Global Technology Operations LLC, Detroit, MI (US); Song-Yul Choe, Auburn, AL (US); Yang Hu, Placentia, CA (US)

( * ) Notice: Subject to any disclaimer, the term of this patent is extended or adjusted under 35 U.S.C. 154(b) by 6 days.

(21) Appl. No.: 17/582,316

(22) Filed: Jan. 24, 2022

(65) Prior Publication Data

US 2023/0275288 A1 Aug. 31, 2023

(51) Int. Cl.
*H01M 10/6572* (2014.01)
*H01M 10/613* (2014.01)
*H01M 10/48* (2006.01)
*H01M 10/6563* (2014.01)
*H01M 10/653* (2014.01)
*H01M 10/63* (2014.01)

(52) U.S. Cl.
CPC ..... *H01M 10/6572* (2015.04); *H01M 10/486* (2013.01); *H01M 10/613* (2015.04); *H01M 10/63* (2015.04); *H01M 10/653* (2015.04); *H01M 10/6563* (2015.04)

(58) Field of Classification Search
CPC ........... H01M 10/6572; H01M 10/613; H01M 10/63; H01M 10/653; H01M 10/6563; H01M 10/486

See application file for complete search history.

(56) References Cited

U.S. PATENT DOCUMENTS

2017/0358831 A1* 12/2017 Milroy .............. H01M 10/6552
2020/0176831 A1*  6/2020 Orlov ................... H01M 10/42

OTHER PUBLICATIONS

Hu et al., "Hybridized time-frequency method for the measurement of entropy coefficient of lithium-ion battery", Electrchimica Acta 362 (Dec. 1, 2020), 137124, available online Sep. 24, 2020, https://doi.org/10.1016/j.electacta.2020.137124.

Yang Hu, et al., "Hybridized time-frequency method for the measurement of entropy coefficient of lithium-ion battery", Electrochimica Acra 362 (2020) 132124, pp. 1-10.

* cited by examiner

*Primary Examiner* — Karie O'Neill Apicella
(74) *Attorney, Agent, or Firm* — Quinn IP Law

(57) ABSTRACT

A battery electric device includes a battery cell, e.g., a pouch, prismatic, or cylindrical cell, connectable to an electric load, and a direct-to-air thermoelectric assembly (TEA) or another heat pump connected to a surface of the cell. A pressure control device maintains constant pressure on the cell surface when the cell is connected to the load. Connection to the load causes the TEA/heat pump to pump heat from the cell. A sensor, e.g., thermocouple(s) and/or heat flux sensor(s), generate an output voltage signal indicative of the quantity of heat. A battery system includes the device and a processor in communication with the cell, the load, and the power supply. The processor generates an electronic control signal in response to the quantity of heat.

20 Claims, 6 Drawing Sheets

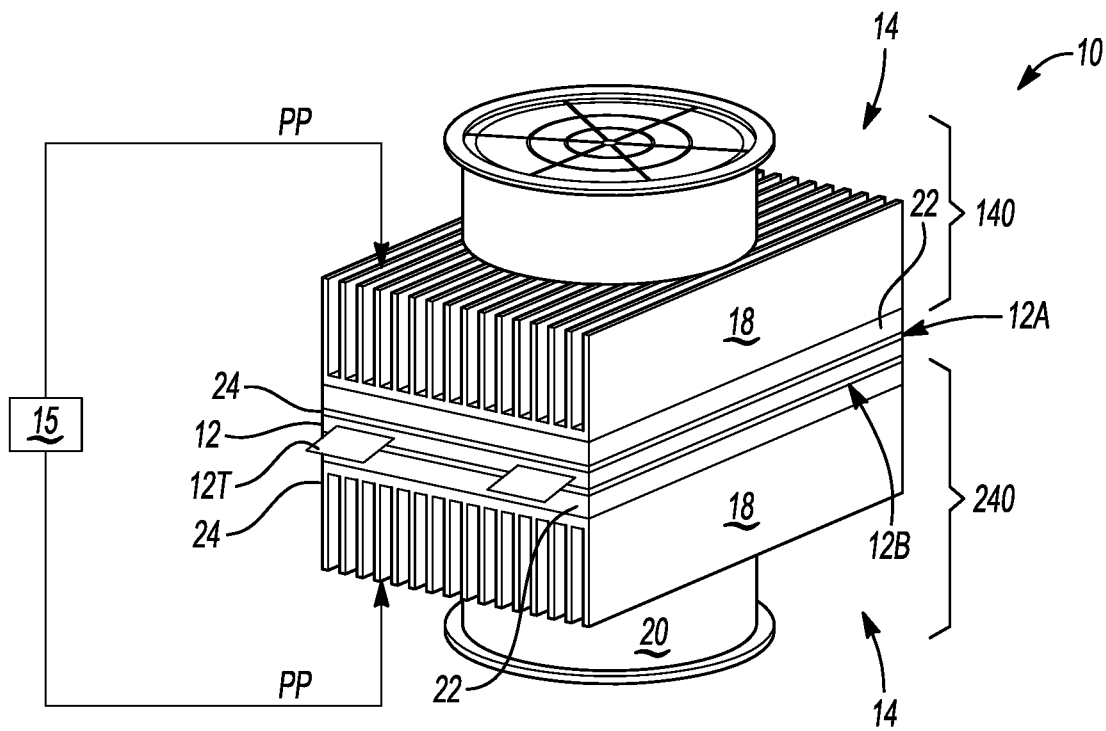
_Fig-1A_
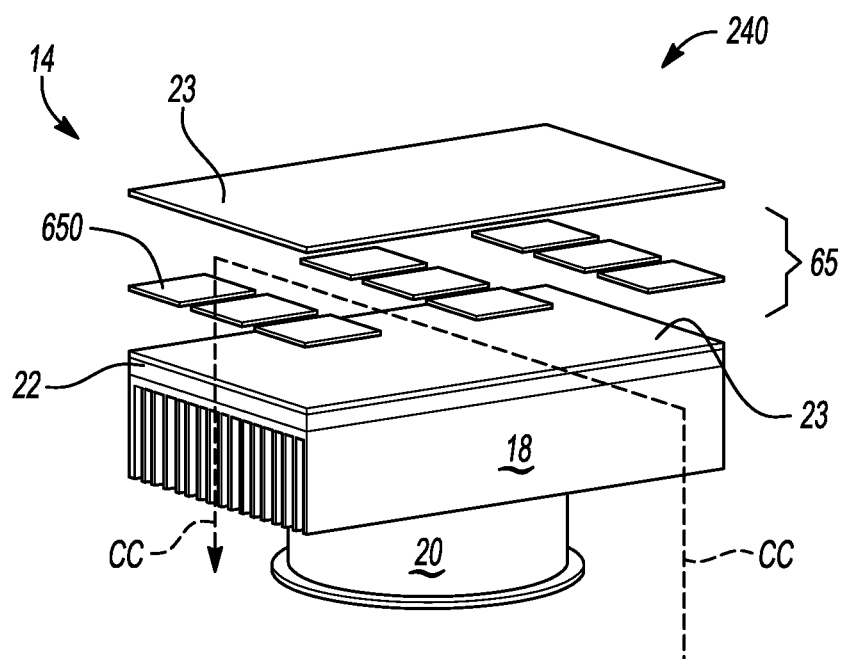
_Fig-1B_

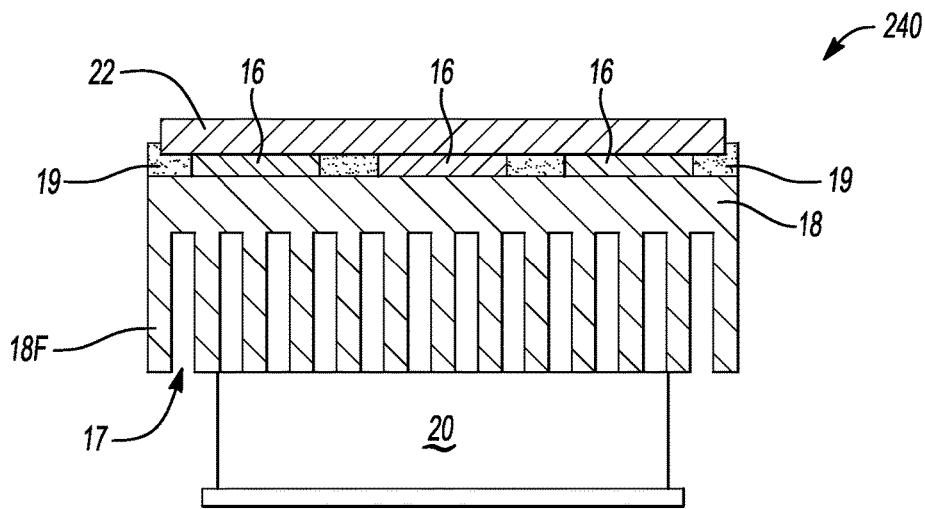
_Fig-1C_
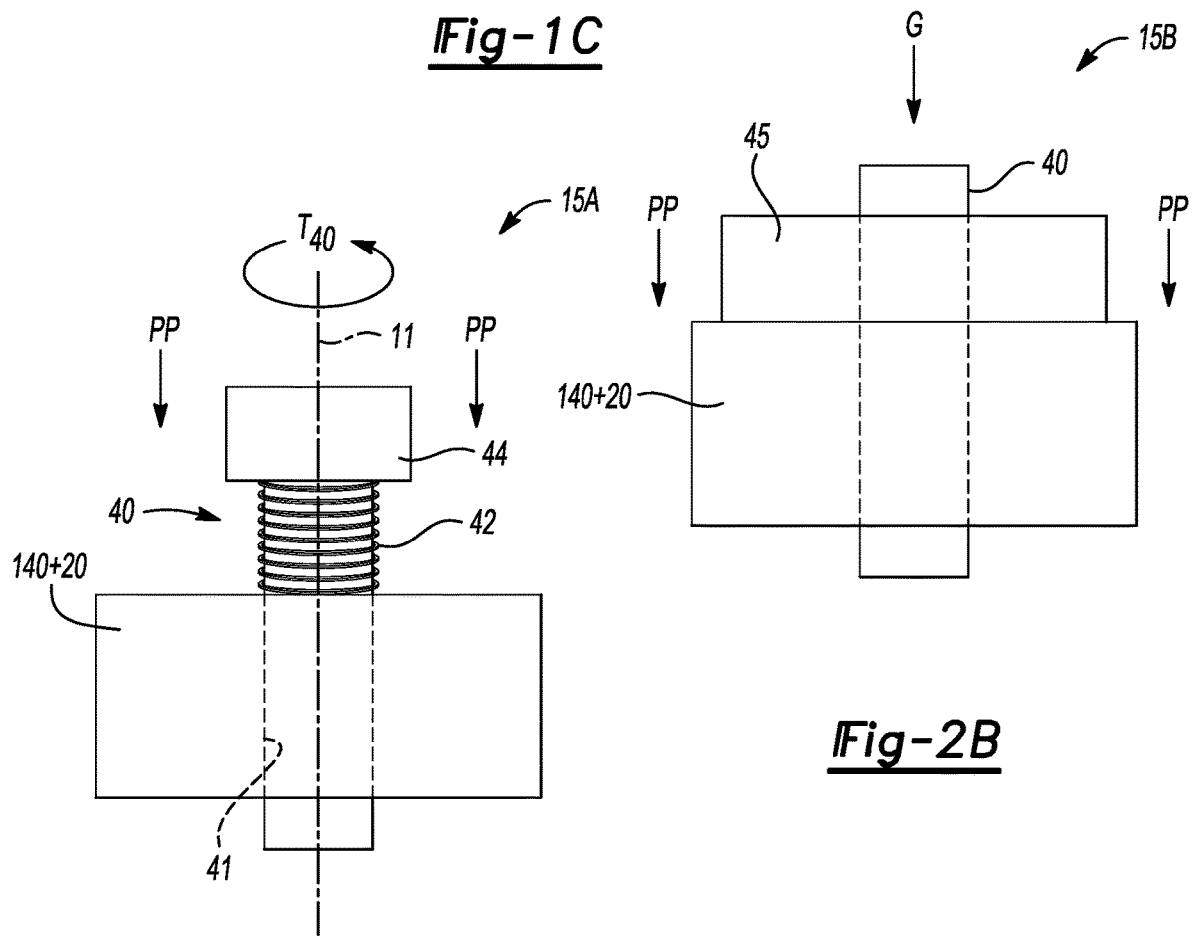
_Fig-2A_
_Fig-2B_

EVALUATION OF CELL-LEVEL HEAT GENERATION IN BATTERY ELECTRIC SYSTEM USING DIRECT-TO-AIR HEAT PUMP

INTRODUCTION

The present disclosure relates generally to battery monitoring strategies and related hardware solutions for measuring and evaluating ongoing heat generation in an electrochemical battery cell.

Battery cells are electrochemical energy storage devices used to store electrical energy within an electric circuit, as well as to release the stored power to a connected electric load. When a battery cell is discharged to the electric load, such as a rotary electric machine, lighting device, or processor bank, the chemical potential energy stored within the battery cell is converted into a direct current (DC) output voltage. In an electrified powertrain system, for instance, the DC output voltage is typically inverted during a discharging operation using a power inverter module. The resulting alternating current (AC) voltage is thereafter used to energize individual phase windings of one or more electric traction motors, power electronic components, or other high-voltage devices. During a charging operation of such an electrified powertrain system, the electrical energy supplied to the battery cell by an offboard charging system or via onboard regeneration is converted to chemical potential energy.

A given battery cell of a rechargeable battery pack undergoes a multitude of charging and discharging cycles throughout the course of its operating life, with both cycles resulting in the generation of often substantial amounts of heat. Operation of a battery cell outside of a well-defined temperature range degrades the battery's performance and shortens its useful service life. Moreover, excessive battery temperatures if left unabated may result in thermal runaway. Lithium-ion battery chemistries are a particular type of battery chemistry commonly used for energizing high-energy devices such as laptop computers and electric vehicle propulsion motors. When energy is stored and retrieved from modern lithium-ion battery packs, heat is generated as a result of charge transport, chemical reactions, and the intercalation and deintercalation processes occurring with each constituent battery cell of the battery pack. Battery electric systems of mobile and stationary devices are therefore equipped to monitor and control the battery's thermal state.

SUMMARY

Disclosed herein are methodologies and related hardware solutions for measuring and evaluating heat generation in an electrochemical battery cell, e.g., of a multi-cell propulsion battery pack for an electrified powertrain system. In particular, the present teachings relate to arrangements of direct-to-air heat pumps positioned on or adjacent to major surfaces of electrochemical battery cells having different configurations, for instance pouch-type, prismatic-type, or cylindrical battery cells. Other embodiments of the contemplated heat pumps may be implemented within the scope of the disclosure, with the heat pumps exemplified herein as commercially-available thermoelectric assemblies (TEAs). Each TEA in turn includes a solid-state thermoelectric module (TEM), an accompanying heat sink, and a rotary fan or another application-suitable thermal regulator device.

Additionally, the disclosed solutions may employ temperature sensors and/or heat flux sensors in conjunction with the aforementioned heat pumps. Alternative exemplary implementations of the present teachings include: (1) a single direct-to-air heat pump and heat sink per battery cell, (2) a distributed array of heat pumps, possibly having different sizes or surface areas, for increased heat measurement accuracy and localization/granularity, and (3) heat pumps formed to a characteristic surface profile of the battery cell, e.g., hemispherical TEAs for use with a corresponding cylindrical battery cell.

As appreciated in the art, calorimeters are scientific measurement devices often used to quantify heat capacity or determine a heat transfer gradient for a given surface of interest. The described battery electric device in its various constructions acts in the manner of a calorimeter to facilitate a rapid response to an applied voltage or when discharging to an electric load, both of which in turn result in battery cell-level heat generation. Moreover, the battery electric device described below, relative to existing approaches, more accurately determines the distribution of a heat generation rate for battery cells held under a calibrated constant pressure. To that end, various pressure control devices are described herein for applying and maintaining the constant pressure, which occurs by compressing the battery cell.

Direct-to-air heat pumps as contemplated herein may optionally include a TEA in the form of a solid-state thermoelectric module (TEM), a corresponding heat sink, and a rotary fan as noted above. As appreciated in the art, a solid-state TEM operates based on the Peltier effect, with an electrical current flowing through the TEM inducing a current-dependent temperature gradient, and vice versa. The generated temperature gradient in turn drives heat from one side of the solid-state TEM to another. It is therefore possible to employ TEAs with integral solid-state TEMs as local heat pumps within a battery or battery pack as contemplated herein.

Various embodiments of the present battery electric device and a host battery system are described below. In one possible configuration, the battery electric device is configured to measure heat generation in a defined area, and/or in multiple dimensions, for a pouch-type or prismatic-type battery cell. This occurs using an assembly of the above-summarized direct-to-air heat pumps, such as one or more TEAs, and possibly in conjunction with a distributed array of heat flux sensors. Such heat flux sensors measure heat flux between a corresponding surface of the battery cell and the heat sink. Constant pressure, for instance about 25 kPA to about 35 kPA in an exemplary embodiment, is applied to the battery cell to maintain good surface-to-surface contact between the TEA(s) and the battery cell, as well as to facilitate appropriate aging where necessary. Benefits of this particular construction include facilitation of a rapid response to an applied current or when discharging to the electric load, with either event resulting in heat generation at the battery cell level, and the ability to accurately determine a heat flux surface distribution.

In another possible embodiment, the battery electric device operates via an array of TEAs in lieu of a single TEA on each side of the battery cell, possibly without using one or more heat flux sensors. This optional variant utilizes the heat pump response of the TEA array to directly measure local heat generation. As with the above-noted exemplary embodiment, a constant pressure is applied to the battery cell, as a compressive force, to ensure adequate contact between the internal electrode layers of the battery cell, and between the battery cell and the TEA array.

Still another embodiment may be implemented for use with cylindrical battery cells to provide similar benefits. In a possible approach, two specially-configured hemispherical battery enclosures or housings cooperate to enclose the cylindrical battery cell therebetween, thereby facilitating efficient heat transfer from the cell surface to the heat sink connected to the enclosure. Lumped heat generation is measured using one or more TEAs and at least one heat flux sensor. Operation of the TEA(s) may be controlled via a bipolar power supply, while the battery cell is connected to a main power supply or to an electric load during respective charging or discharging modes of operation, i.e., with the main power supply delivering an electrical current or voltage to the battery cell and the electric load receiving a current or voltage from the battery cell.

The heat flux sensor(s) in this particular embodiment are configured to measure heat flux as heat radiates from the surface of the battery cell to the heat sink, concurrently with control of the TEAs. This optional construction is suitable for use with cylindrical battery cells to facilitate a dynamic response to the applied voltage and current from the main power supply to measure cell-level heat generation, or to control the cell's discharging response when connected to the applied electric load. Heat generated for a battery cell having a cylindrical profile is thus determinable by accurately quantifying the amount of heat pumped by the TEAs. Such an approach may be contrasted with existing calorimeters that measure temperature gradients in a battery cell under adiabatic conditions. In some constructions, multiple battery cells having a cylindrical profile may be linked in parallel to measure heat generation of a mini-module or cell grouping, and thus the simplified one-cell example used herein is non-limiting.

In a specific embodiment as described herein, the battery electric device includes an electrochemical battery cell, a direct-to-air heat pump, and a pressure control device. The battery cell is selectively connectable to an electric load or a main power supply in respective discharging or charging modes of the battery cell as disclosed above. The heat pump, which is connected to a cell surface of the battery cell, includes a heat sink and a fan operable configured for cooling the heat pump. The pressure control device in turn is configured to apply a constant pressure to the battery cell during the discharging or charging modes.

The heat pump may be optionally embodied as one or more TEAs, with each of the TEAs including a solid-state TEM in addition to the above-noted heat sink and fan.

Embodiments of the battery electric device include a processor is in communication with the heat pump/TEA, with the processor configured to calculate a quantity of heat being pumped from the battery cell at a given temperature setpoint. The processor controls the bipolar power supply to maintain the temperature setpoint, with the processor doing so based on the quantity of heat.

The battery cell may be a pouch-type or a prismatic-type battery cell, as noted above, with both constructions being well understood in the art of battery electric systems. The TEA in this instance possibly includes a distributed array of TEAs, with the TEAs being one embodiment of the heat pump as summarized above. Each respective TEA of the distributed array of TEAs is positioned on a corresponding surface area section of the battery cell. The battery electric device may include first and second TEAs, i.e., nominal "upper" and "lower" TEAs when the battery electric device is positioned in an upright orientation, with the battery cell being disposed or sandwiched between the TEAs.

An aspect of the disclosure includes an array of heat flux sensors. The individual heat flux sensors of such an array are distributed on the cell surface and configured to measure local heat flux at the corresponding surface area section thereof.

The battery electric device in one or more possible implementations is characterized by an absence of one or more heat flux sensors. The TEA in such an embodiment may include a plurality of TEAs, with each respective TEA conforming to a surface profile of the battery cell. The battery cell may be optionally embodied as a cylindrical battery cell. In such an embodiment, the TEAs may include a pair of mutually-engaged hemispherical battery enclosures, with a cast heat sink, which collectively enclose the battery cell therebetween.

In one or more embodiments, an external process controller may be placed in communication with the processor. The external process controller may be configured to execute a control action with respect to the battery cell in response to the quantity of heat. When the battery cell is used as part of a larger battery device, for instance a propulsion battery pack for an electric vehicle, the process controller may execute the control action. For example, suitable control actions include commanding a powerflow change of the battery cell, i.e., adjusting a charging or discharging rate of the battery cell, or commanding a thermal regulation operation thereof, initiating a maintenance action of the battery cell, and/or alerting an operator as to the existence of a possible thermal or electrical fault in the battery system.

According to yet another embodiment, a battery system includes the above-summarized battery electric device and a processor in communication with the battery cell and the electric load. The processor is configured to receive the output voltage signal from the sensor(s) when the battery cell is connected to the electric load, e.g., a resistive, inductive, capacitive, or impedance load, and to generate an electronic control signal in response to the quantity of heat. The electronic control signal in turn may initiate a control action with respect to the battery cell.

A method is also disclosed for constructing a battery electric device for use with an electric load. An implementation of the present method includes arranging a plurality of heat flux sensors on a cell surface of an electrochemical battery cell. The method also includes providing a pair of direct-to-air TEAs each respectively having one or more solid-state TEMs, a fan, and a heat sink, and a metal plate. The one or more TEMs are disposed between the heat sink and the metal plate. Additionally, the method in this embodiment includes positioning the battery cell and the heat flux sensors arranged thereon between the metal plate of each of the pair of direct-to-air TEAs, and then using a pressure control device to apply a constant pressure to the cell surface. This occurs when the battery cell is connected to the electric load as the TEAs actively pump a quantity of heat to or from the battery cell. A measured output voltage signal indicative of the quantity of heat is then transmitted to a processor, via the plurality of heat flux sensors.

The above features and advantages, and other features and attendant advantages of this disclosure, will be readily apparent from the following detailed description of illustrative examples and modes for carrying out the present disclosure when taken in connection with the accompanying drawings and the appended claims. Moreover, this disclosure expressly includes combinations and sub-combinations of the elements and features presented above and below.

BRIEF DESCRIPTION OF THE DRAWINGS

FIG. 1A is a perspective view illustration of a representative battery electric device having a battery cell enclosed between opposing heat pumps in accordance with an aspect of the disclosure.

FIG. 1B is an exploded view illustration of the battery electric device shown in FIG. 1A.

FIG. 1C is a cross-sectional side view illustration of the battery electric device depicted in FIGS. 1A and 1B, taken along cut line CC of FIG. 1B.

FIGS. 2A and 2B are side view illustrations of two possible implementations of a pressure control device usable with the battery electric device of FIGS. 1A-1C.

DETAILED DESCRIPTION

Figure 3:
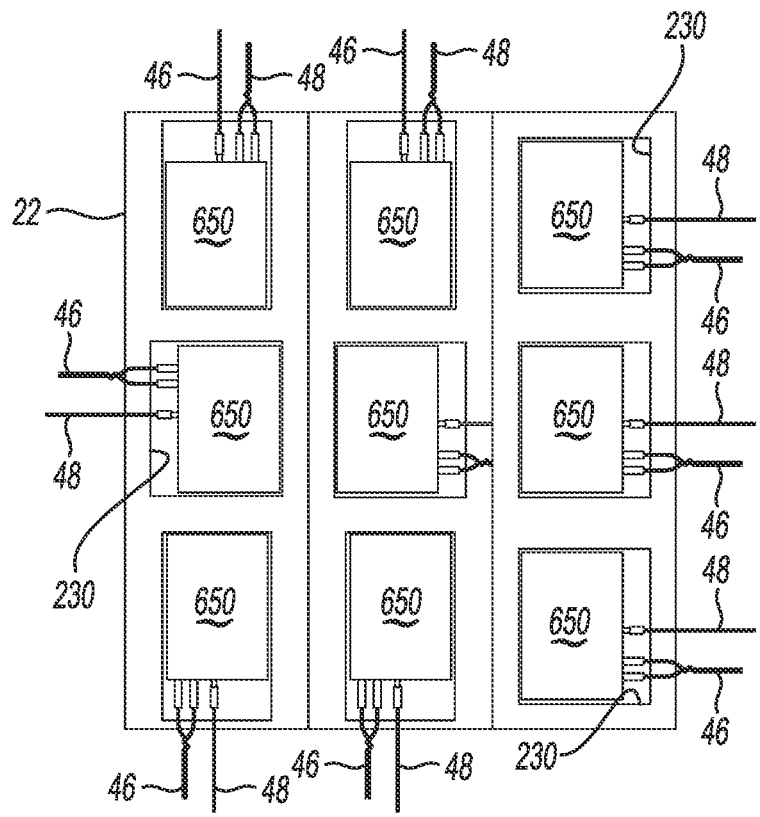
FIGS. 3 and 4 are a respective plan view and an exploded view illustration of a possible implementation of the battery electric device depicted in FIGS. 1A-1C.

The present disclosure is susceptible of embodiment in many different forms. Representative examples of the disclosure are shown in the drawings and described herein in detail as non-limiting examples of the disclosed principles. To that end, elements and limitations described in the Abstract, Introduction, Summary, and Detailed Description sections, but not explicitly set forth in the claims, should not be incorporated into the claims, singly or collectively, by implication, inference, or otherwise.

For purposes of the present description, unless specifically disclaimed, use of the singular includes the plural and vice versa, the terms "and" and "or" shall be both conjunctive and disjunctive, "any" and "all" shall both mean "any and all", and the words "including", "containing", "comprising", "having", and the like shall mean "including without limitation". Moreover, words of approximation such as "about", "almost", "substantially", "generally", "approximately", etc., may be used herein in the sense of "at, near, or nearly at", or "within 0-5% of", or "within acceptable manufacturing tolerances", or logical combinations thereof.

Figure 8:
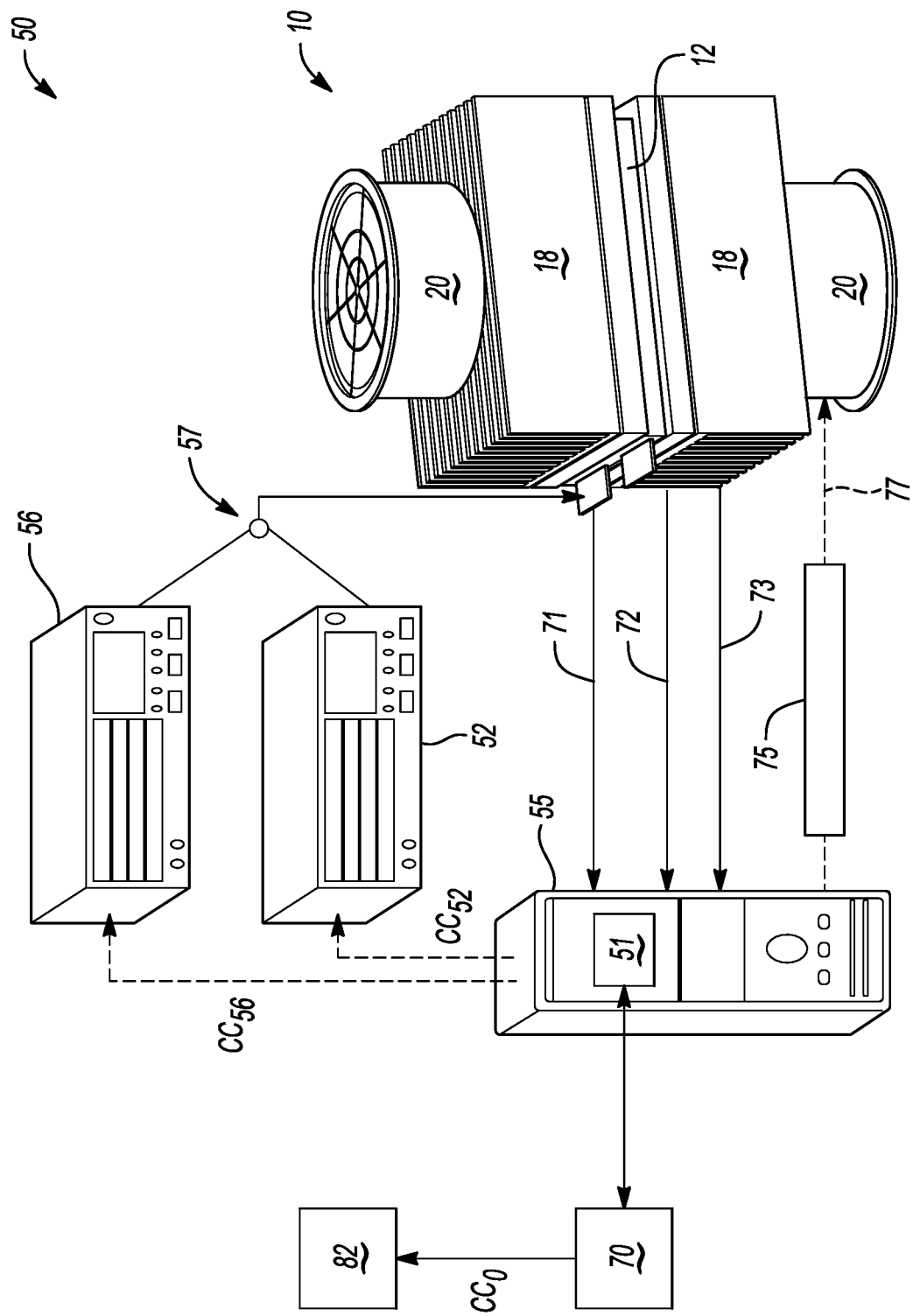
FIG. 8 is a schematic illustration of a monitoring system for use with the battery electric device of FIGS. 1A-7.

Referring to the drawings, wherein like reference numbers refer to like features throughout the several views, FIG. 1A depicts a battery electric device 10 in accordance with an exemplary embodiment of the present disclosure. The battery electric device 10 includes an electrochemical battery cell 12, one or more direct-to-air heat pumps 14, and a pressure control device 15. The battery electric device 10 as set forth in detail herein is usable with a battery system 50 as shown in FIG. 8 to accurately measure and evaluate heat generation in the battery cell 12, with electrode tabs 12T thereof protruding from the battery electric device 10 as cathode and anode extensions of the battery cell 12. Moreover, the increased accuracy of the present strategy relative to existing approaches facilitates reliable, longer-term operation of the battery cell 12, and thus benefits a myriad of applications, including but not limited to electric vehicle propulsion systems, laptop computers and other portable electronic devices, and commercial or residential power plants.

Figure 7:
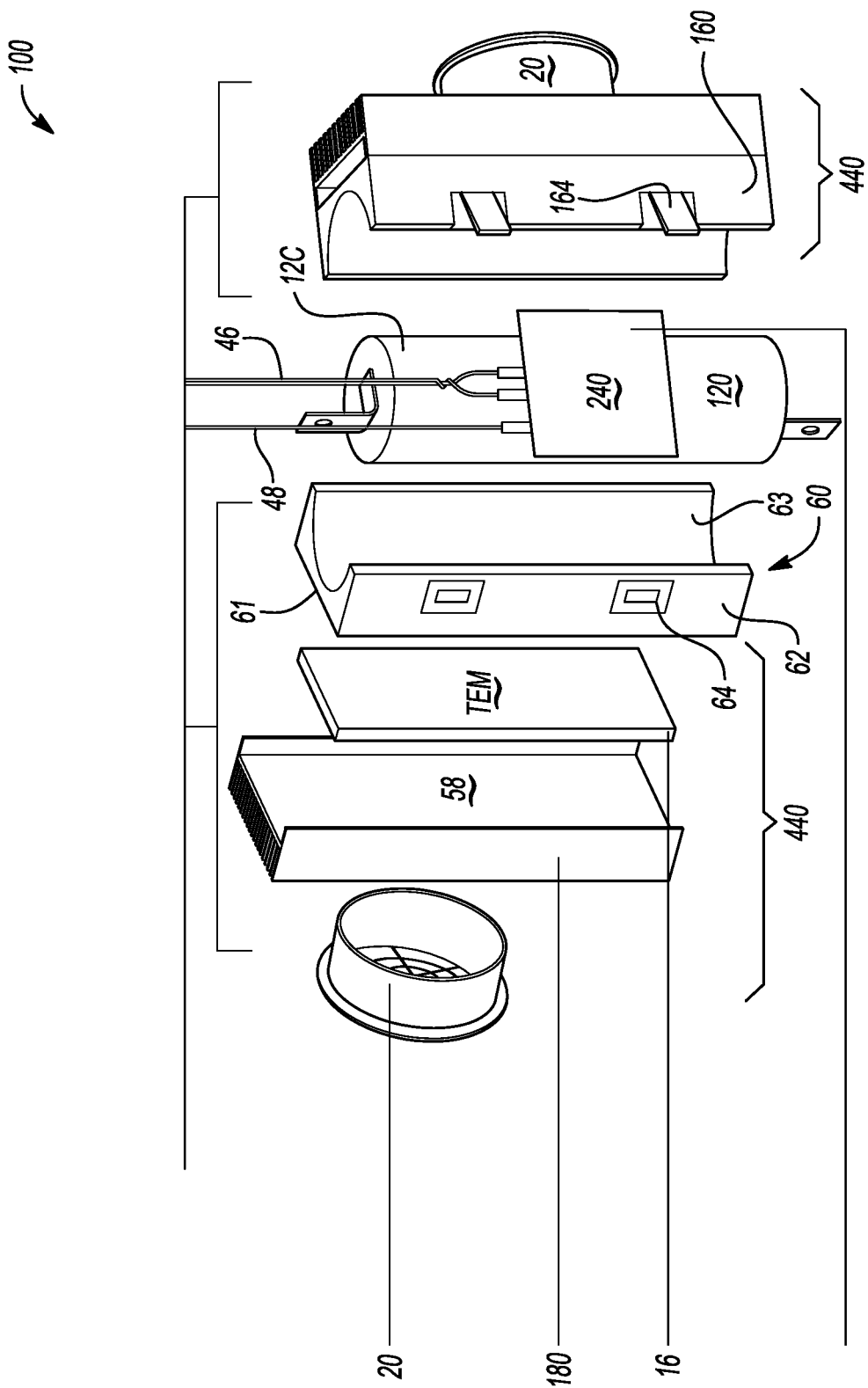
FIG. 7 is an exploded view illustration of an alternative embodiment of the battery electric device shown in FIGS. 1A-6 in which the battery cell has a cylindrical profile.

In the illustrated configuration of FIGS. 1A-1C, with FIG. 1C being a cross-sectional view taken along cut line CC of FIG. 1B, the direct-to-air heat pumps 14 include respective first and second thermal electric assembly (TEAs) 140 and 240, which are in thermal communication with a corresponding cell surface 12A and 12B of the battery cell 12. As shown, the battery cell 12 is embodied as a pouch-type or prismatic-type electrochemical cell, and thus is relatively flat in its profile. For illustrative simplicity and clarity, the battery cell 12 is represented as being perfectly rectangular and planar, with actual embodiments varying from this ideal, as appreciated in the art. The present solutions may be applied to other configurations of the battery cell 12, including cylindrical constructions as shown in FIG. 7, and therefore the implementation of FIGS. 1A-1C is representative of just one possible application of the present teachings.

Each respective one of the respective first and second TEAs 140 and 240 includes a solid-state thermoelectric module (TEM) 16 as best shown in FIG. 1C, a heat sink 18, and a fan 20 operable for cooling the TEA 140 or 240, i.e., by circulating ambient air through or with respect to the respective heat sink 18. The pressure control device 15 of FIG. 1A is configured to apply a constant pressure (arrows PP) to the battery cell 12 when the battery cell 12 is connected to an electric load 52, an example of which is provided below with reference to FIG. 8. In the illustrated embodiment of FIG. 1A, the battery cell 12 is enclosed or sandwiched between the respective first and second TEAs 140 and 240. In this arrangement, a compression of the battery cell 12 achieves the constant pressure (arrow PP), with representative configurations of the pressure control device 15 shown in FIGS. 2A and 2B and described below.

The heat sink 18 of FIGS. 1A-1C, e.g., a multi-finned solid or sintered block of metal having sufficient surface area for radiating heat from the battery cell 12 to the ambient, may be bonded to a metal plate 22 or formed integrally therewith. A thermal pad 23 constructed of a thermally-conductive material, e.g., a silicone-based material or another application suitable material, may be positioned adjacent to the metal plate 22 for the purpose of optimizing heat conduction between the battery cell 12 and the first and second TEAs 140 and 240.

As depicted in FIG. 1B, the second TEA 240 is representative of the construction of the first TEA 140, and thus a description of the second TEA 240 applies to the structure of the first TEA 140. Some embodiments of the battery electric device 10 of FIG. 1A may optionally include an array 65 of heat flux sensors 650. The individual heat flux sensors 650 are distributed with respect to different areas of the battery cell 12 of FIG. 1A, such that each respective heat flux sensor 650 is configured to measure local heat flux at a corresponding portion of the cell surface 12A or 12B. A flexible graphite sheet (see FIG. 4) may also be used in some implementations to help mitigate thermal runaway and maintain a uniform temperature.

As appreciated in the art, unlike thermocouples and other temperature sensors which measure a present temperature state as a discrete temperature, and tend to respond slowly with high overshoot, flux sensors tend to be fast acting with higher in resolution, and thus are able to quickly ascertain phase transitions in the battery cell 12 during charging and discharging operations. Thus, while temperature measurements remain useful in battery monitoring and control operations, the addition of flux measurement may enhance the level of knowledge of static and dynamic thermal conditions of the battery cell 12.

In a possible embodiment, the optional heat flux sensors 650 of FIG. 1B may be implemented as serially-connected semiconductor piles configured to detect convection, conduction, and radiation types of heat flux. As appreciated in the art, and according to the Seebeck effect, a temperature gradient existing between dissimilar electrically conductive materials produces a voltage difference, with the voltage difference being proportional to the quantity of heat passing through a surface, in this instance the cell surface 12A or 12B of the battery cell 12 (FIG. 1A). The optional array 65 of heat flux sensors 650 in FIG. 1B is thus usable as part of the battery electric device 10 of the present disclosure, with other possible embodiments being characterized by an absence of the heat flux sensors 650.

FIG. 1C for its part shows a representative configuration of the second TEA 240 in a cross-sectional side view, in which the TEMs 16 are optionally embedded in a thermally-conductive foam material 19 between the heat sink 18 and the metal plate 22. Thicknesses of the TEMs 16 and foam material 19 are not to scale, but rather exaggerated for illustrative clarity. The use of foam material 19 in this manner may help to secure, cushion, and retain the TEMs 16 at an optimal location adjacent the heat sink 18. In a possible configuration, the heat sink 18 may include a plurality of cooling fins 18F separated by air gaps 17 as shown, which enables good airflow and heat removal from the battery cell 12.

Referring briefly to FIGS. 2A and 2B, various solutions exist for implementing the pressure control device 15 of FIG. 1A when applying the constant pressure (arrows PP) to the cell surfaces 12A and 12B concurrently with pumping heat to or from the battery cell 12. As shown in FIG. 2A, for example, the first TEA 140 in this instance, and its heat sink 18, could slide up and down on rods, one of which is represented as rod 40, via through-holes 41 drilled into the first TEA 140 and heat sink 18. Such an implementation would align the first and second TEAs 140 and 240 and their respective heat sinks 18 and thus minimize lateral movement. The first TEA 140 and its associated heat sink 18 are left free to move up and down on the aforementioned rods 40, and the constant pressure (arrows PP) could thereafter be applied in various ways. The constant pressure (arrows PP), which may differ with the application, is about 25 kPA to about 35 kPA in a non-limiting exemplary embodiment.

By way of example and not limitation, a spring 42 as shown in FIG. 2A may be set on the above-noted rod 40 above the first TEA 140/heat sink 18, with sufficient displacement such that the spring 42 does not vary appreciably with expansion and contraction of the battery cell 12. A nut 44 may be attached at the top of the rod 40 as shown, such that the spring 42 resides between the nut 44 and the first TEA 140/heat sink 18. The constant force (arrow PP) may be applied by tightening the nut 44 on each rod 40, i.e., via a torque (arrow $T_{40}$) applied about an axis 11 of the rod 40. In an embodiment, the plates 22 of FIG. 1A may be slightly extended parallel to the battery cell 12 to allow for connections via the rods 40, with the rods 40 and nuts 44 effectively acting as pressure control screws in FIG. 2A.

Alternatively as shown in FIG. 2B, one may instead set a calibrated mass 45 on top of the first TEA 140/heat sink 18 to a similar effect, with FIG. 2B assuming that the first TEA 140 is located directly above the second TEA 240. The mass 45 in such an implementation is placed with its thickness direction arranged normal to the direction of gravity (arrow G). Other solutions not specifically shown in the Figures may be envisioned within the scope of the disclosure, including attaching a computer-controlled hydraulic or electric press and controlling the same to raise and lower the first TEA 140 and heat sink 18, possibly informed by feedback from a pressure controller.

Figure 4:
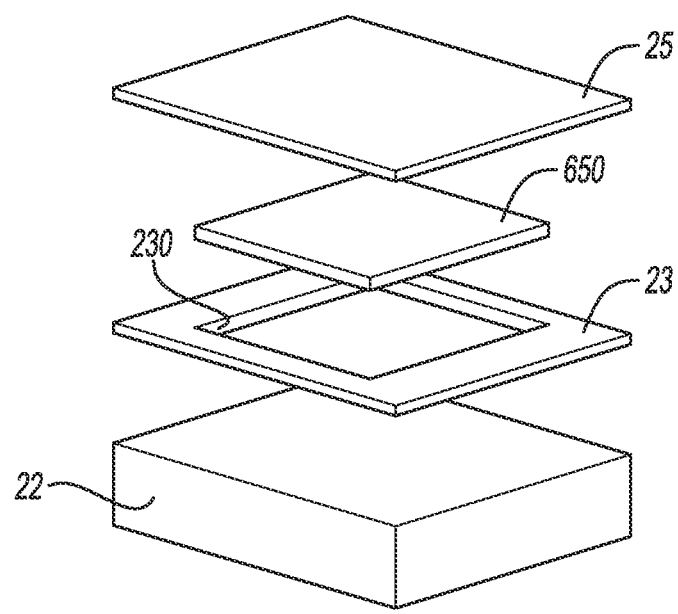

Referring now to FIG. 3, the heat flux sensors 650 of FIG. 2B may be spaced apart from each other as shown, with nine of the heat flux sensors 650 used in the non-limiting embodiment. Each respective one of the heat flux sensors 650 rests on a designated portion of the metal plate 22 and is surrounded by corresponding window 230 formed in the thermal pad 23. The flexible graphite sheet 25 of FIG. 1B, omitted from FIG. 3 for illustrative clarity but shown in FIG. 4, is disposed on top of the heat flux sensors 650. Measurements taken by the individual heat flux sensors 650 may be communicated to the processor 51 of FIG. 8 via corresponding output voltage leads 46. Each respective heat flux sensor 650 or a thermocouple in an alternative embodiment may also communicate a discrete temperature signal via one or more of the output voltage leads 48.

The particular arrangement of the heat flux sensors 650 and the relative locations of the output voltage leads 46 within a given window 280 of the thermal pad 23 may vary with the application. Thus, as depicted in FIGS. 3 and 4 for a given heat flux sensor 650, the heat flux sensor 650 may be disposed within a corresponding one of the windows 230 adjacent to the metal plate 22, and ultimately covered by the graphite sheet 25 as shown in FIG. 4, with FIG. 4 illustrating one of the hear flux sensor 650 and a corresponding window 230 of FIG. 3 for illustrative clarity.

The particular arrangement of the TEAs 140 and 240 on a given battery cell 12 may vary with the application and the construction or profile of the battery cell 12, with the battery electric device 10 of FIG. 1A using such an arrangement possibly being characterized by an absence of the heat flux sensors 650 as noted above. The TEAs 140 and 240 help determine heat generation of the battery cell 12 by pumping a certain amount of heat, typically in order to control to a temperature setpoint. For example, if the battery cell 12 is set at 25° C. as the aforementioned temperature setpoint, the heat generated at 25° C. —a temperature maintained by a separate controller as appreciated in the art—could be calculated using the electrical signal communicated via the output voltage leads 48 of FIG. 3, with such an electrical signal being indicative of the heat pumped to the battery cell 12 to maintain the 25° C. temperature setpoint in this representative example.

Figure 5:
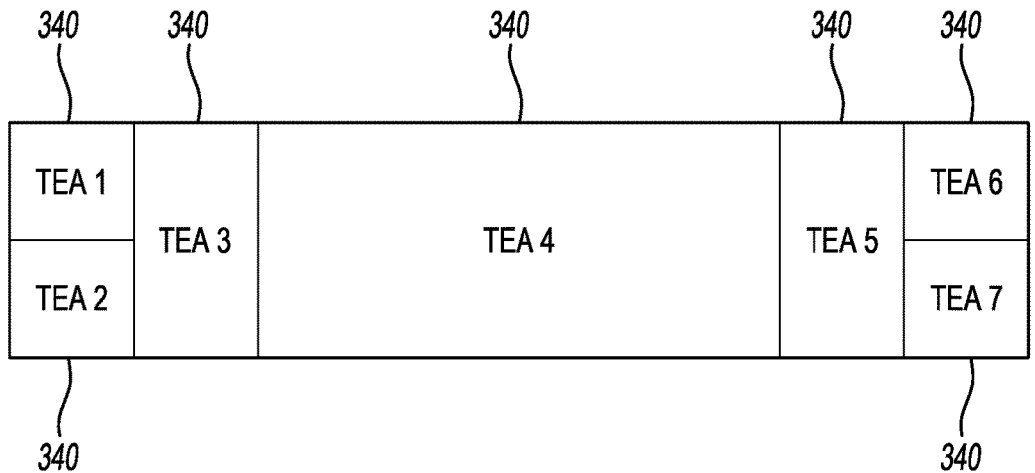
FIGS. 5 and 6 are respective schematic plan view and side view illustrations of an alternative configuration of the battery electric device of FIGS. 1A-1C.
Figure 6:
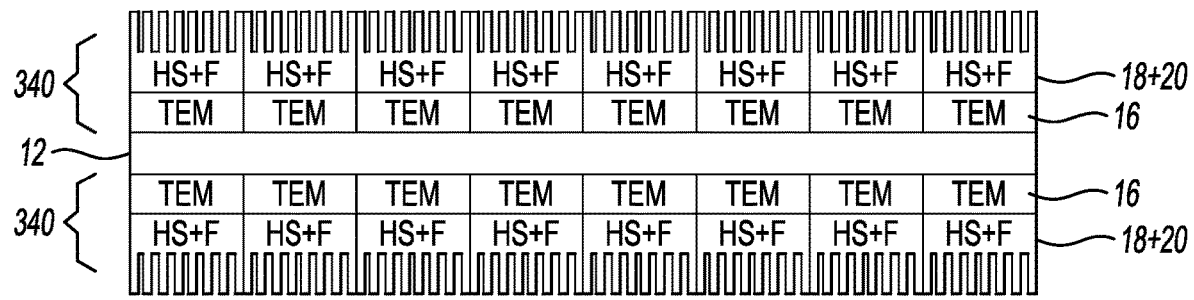

Referring briefly to FIGS. 5 and 6, TEAs 340 or other heat pumps of different sizes could be arranged different on different areas of the cell surfaces 12A and 12B of the battery cell 12 shown in FIG. 1A, in lieu of the exemplary construction shown in FIGS. 1A-1C. More or smaller TEAs 340 may be used in a smaller area, for instance, to provide more precise or granular data, perhaps in areas more susceptible to adverse effects of heat. Inboard areas of the battery cell 12, or areas requiring less granular or precise data, may be equipped with fewer TEAs, as represented by TEA 4. Flanking TEA 4 in the non-limiting arrangement of FIG. 5 are two smaller TEAs 340, i.e., TEA 3 and TEA 5, which in turn are located adjacent still smaller TEAs 340, in this example labeled TEA 1 and TEA 2 (adjacent TEA 3) and TEA 6 and TEA 7 (adjacent TEA 5). Thus, the present teachings envision use of as few as one TEA 340 per battery cell 12, up to a several TEAs 340 per battery cell 12, with seven TEAs 340 used in the non-limiting example embodiment of FIG. 5 for a given major surface of the battery cell 12.

In contrast, FIG. 6 in a schematic side view illustration shows the use of eight equally-sized TEAs 340 per major cell surface 12A and 12B of the battery cell 12. The constant pressure (arrows PP) of FIGS. 2A and 2B may be about 25 kPA to about 35 kPA in an exemplary embodiment. Each respective TEM 16 of the TEAs 340 may conform to a surface profile of the battery cell 12. This may be the case regardless of the shape or outer profile of the battery cell 12, with generally flat configurations common to pouch-type cells shown in FIGS. 1A-6.

Referring now to FIG. 7, a battery electric device 100 may include a cylindrical embodiment of the battery cell 12, with such an embodiment indicated as cylindrical battery cell 120. The plurality of TEAs in this instance includes a pair of mutually-engaged TEAs 440 which enclose the cylindrical battery cell 120 therebetween. In the illustrated representative embodiment, the cylindrical battery cell 120 is attached to a single heat flux sensor 650. Additional heat flux sensors 650 may be used in other embodiments. Each TEA 440 includes a corresponding fan 20 and heat sink 180, consistently with the previously disclosed embodiments.

The heat sinks 180 in this instance may be cast in generally u-shaped arrangement as shown, with the heat sinks 180 having a planar floor 58. As part of the illustrated construction, the TEA 440 includes a battery enclosure 60 having a flat surface 61, longitudinal side walls 62, and hemispherical inner surface 63 connecting the side walls 62. The TEM 16 in this embodiment may be enclosed between the planar floor 58 of the heat sink 180 and the flat surface 61 of the enclosure 60. The side walls 62 of the TEAs 440 may define a latching mechanism, e.g., a mating clasp 64 and 164, which cooperate with one another to securely clamp together around a circumference of the cylindrical battery cell 120. The resulting clamshell-like engagement is thus used to enclose the cylindrical battery cell 120. The heat flux sensor 650, which may have a size, number, and distribution in accordance with the application or intended end use, is shown with an exaggerated size in FIG. 7 for illustrative clarity, and may be curved and/or reduced in size to fit on a circumferential cell surface 12C of the battery cell 120 in some embodiments.

Referring now to FIG. 8, the battery system 50 is shown according to an exemplary hardware setup in which an external process controller 70 is in communication with the processor 51 of a battery control module 55. The external process controller 70 is configured to execute a control action with respect to the battery cell 12 and/or the electric load 52 in response to the measured quantity of heat, e.g., via transmission of an electronic control signal (arrow CCo) to a controlled downstream device 82. The controlled downstream device 82 may include, by way of example and not limitation, a coolant system for a main battery pack inclusive of the battery cell 12, an indicator device configured to illuminate in response to the electronic control signal (arrow CCo), or a motor control processor for a rotary electric machine (not shown) connected to the battery cell 12, e.g., as the electric load 52. In the exemplary setup, the battery cell 12 is connected to a main power supply 56 and the electric load 52 via a switching device 57, with the state of the main power supply 56 and the electric load 52 ultimately controlled via the processor 51 via corresponding power supply and electric load control signals (arrow $CC_{56}$ and $CC_{52}$, respectively). The electric load 52 allows for discharge of the battery cell 12 and dissipates the discharged power, e.g., through resistive heating, or the electric load 52 may reroute the power for other applications. The main power supply 56 for its part charges the battery cell 12 by applying a power and electric potential greater than the current cell voltage.

Information provided to the processor 51 in the course of operating the battery system 50 of FIG. 8 may include a measured current and/or voltage signal 71, a measured temperature signal 72, and the measured heat flux signal 73. As appreciated in the art, heat flux is the heat transfer rate per unit area, and may be expressed as $\dot{Q}/A$, where $\dot{Q}$ is the heat transfer rate in British Thermal Units (BTU) per hour, and A represents the corresponding surface area expressed in $ft^2$. Additionally, a bipolar power supply 75 supplies a temperature control signal 77 to the battery electric device 10 to cause the fans 20 to maintain a constant setpoint temperature when the battery electric device 10, and in particular the battery cell 12 enclosed therein, is held under the constant pressure by the pressure control system 15 of FIG. 1A as described above.

Those skilled in the art in view of the foregoing disclosure will appreciate that various methodologies are enabled by the described battery electric device 10 and its alternative constructions. For instance, a method for constructing the battery electric device 10 for use with the electric load 52 of FIG. 2 may entail arranging a plurality of the heat flux sensors 650 of FIG. 1B on a cell surface 12A and/or 12B of the electrochemical battery cell 12. Such a method also includes providing a pair of direct-to-air TEAs, e.g., the TEAs 140 and 240 shown in FIG. 1A, with one or more TEMs 16 (FIG. 1C) disposed between the heat sink 18 and the metal plate 22.

As part of this exemplary method, one may position the battery cell 12 and the heat flux sensors 650 arranged thereon between the metal plate 22 of each of the pair of direct-to-air TEAs 140 and 240. The pressure control device 15 is then used to apply a constant pressure to the cell surfaces 12A and 12B, i.e., by even compressing the battery cell 12 when the battery cell 12 is connected to the electric load 52 as the TEAs 140 and 240 actively pump a quantity of heat to or from the battery cell. Such a method may include transmitting to the processor 51 of FIG. 8, via the plurality of heat flux sensors 650, an output voltage signal 72 and/or 73 indicative of the quantity of heat. Embodiments of this method may also include determining, via the processor 51 using the output voltage signal 72 and/or 73, the quantity of heat pumped from the battery cell 12 at a calibrated temperature setpoint, with the quantity of heat in this instance being the heat flux. The processor 51 thereafter controls an operation of the battery electric device 10 to maintain the temperature setpoint. Other control actions, possibly prompted by the controller 70 of FIG. 8, may include commanding a powerflow change of the battery cell 12, or commanding a thermal regulation operation thereof, with such actions occurring in response to the quantity of heat.

As will be appreciated by those skilled in the art, a battery cell under operation generally generates heat (exothermic) because ohmic resistances typically dominate compared to other heat source terms. However, under certain use cases the heat generation of the battery cell can appear to be negative (endothermic). This is because the reversible heat (entropic source) actually shifts negative and dominates the ohmic heat generation source term. Thus, while various examples set forth herein measure heat flux flowing from the battery cell to the surrounding environment, a specific use case or cases exist in which heat flows from the environment to the battery cell during isothermal operation. Those skilled in the art will appreciate that the present teachings may be extended to exothermic or endothermic operations of the various battery cells 12 described herein.

The various hardware solutions and methodologies described herein allow for accurately and area-specific evaluation of non-uniform heat generation in an electrochemical battery cell or larger batteries constructed from multiple such cells using purposeful arrangements of direct-to-air heat pumps, in which the battery cell is enclosed between opposing heat pumps, themselves exemplified herein as solid-state thermoelectric assemblies. The disclosed solutions may be embodied for use with pouch and prismatic battery cells, with structural modifications to the heat pump enabling profile-matching integration with cylindrical battery cells. Collectively, the use of such heat pumps in conjunction with the constant pressure applied during a heat pumping operation ensure a more reliable approach for cell-level thermal evaluation in the battery cell, as well as in battery systems employing the battery cell. These and other attendant benefits will be readily appreciated by those skilled in the art in view of the foregoing disclosure.

The detailed description and the drawings or figures are supportive and descriptive of the present teachings, but the scope of the present teachings is defined solely by the claims. While some of the best modes and other embodiments for carrying out the present teachings have been described in detail, various alternative designs and embodiments exist for practicing the present teachings defined in the appended claims. Moreover, this disclosure expressly includes combinations and sub-combinations of the elements and features presented above and below.

What is claimed is:

1. A battery electric device for use with an electric load, comprising:
   an electrochemical battery cell connectable to the electric load and having cell surfaces;
   a plurality of direct-to-air heat pumps each arranged on and in thermal communication with a respective one of the cell surfaces, including first and second direct-to-air heat pumps between which the electrochemical battery cell is disposed;
   a pressure control device configured to apply a constant pressure to the cell surface when the battery cell is connected to the electric load, wherein connection of the battery cell to the electric load causes the direct-to-air heat pump to pump a quantity of heat from the battery cell;
   at least one sensor configured to generate an output voltage signal indicative of the quantity of heat; and
   a processor in communication with the at least one sensor, wherein the processor is configured to determine the quantity of heat that is pumped from the battery cell at a calibrated temperature setpoint using the output voltage signal, and to thereafter control an operation of the battery electric device in response to the quantity of heat to maintain the temperature setpoint.

2. The battery electric device of claim 1, wherein the direct-to-air heat pumps include a thermoelectric assembly (TEA) having a solid-state thermoelectric module (TEM), a heat sink, and a fan operable for cooling the TEM in response to a temperature control signal.

3. The battery electric device of claim 2, wherein the battery cell is a pouch-type battery cell or a prismatic-type battery cell, and wherein the TEA includes a distributed array of TEAs, each respective TEA of the distributed array of TEAs being positioned on a corresponding surface area section of the battery cell.

4. The battery electric device of claim 1, wherein the processor is configured to determine the quantity of heat that is pumped from the battery cell as a distribution of a heat generation rate for the battery cell when the battery cell is held under the constant pressure, and to control the operation of the battery electric device to maintain the temperature setpoint in response to the heat generation rate.

5. The battery electric device of claim 4, wherein the battery electric device includes a first TEA and a second TEA as the first and second direct-to-air heat pumps, and the battery cell is disposed between the first TEA and the second TEA.

6. The battery electric device of claim 1, wherein the at least one sensor includes at least one heat flux sensor.

7. The battery electric device of claim 6, wherein the at least one heat flux sensor comprises an array of heat flux sensors, wherein each respective one of the heat flux sensors of the array of heat flux sensors is distributed on the cell surface and configured to measure local heat flux at a corresponding portion of the cell surface.

8. The battery electric device of claim 1, wherein the battery electric device is characterized by an absence of a heat flux sensor.

9. The battery electric device of claim 1, wherein each respective heat pump of the plurality of heat pumps conforms to a surface profile of the battery cell.

10. The battery electric device of claim 9, wherein the battery cell is a cylindrical battery cell and the plurality of heat pumps include a pair of mutually-engageable thermoelectric assemblies (TEAs) which together enclose the battery cell therebetween.

11. The battery electric device of claim 10, wherein each of the TEAs includes a hemispherical battery enclosure, a solid-state thermoelectric module (TEM), and a heat sink, and the TEM of each corresponding one of the TEAs is positioned between the respective hemispherical battery enclosure and the respective heat sink.

12. The battery electric device of claim 1, wherein the heat pump defines a through-hole within which is positioned a corresponding rod, and wherein the pressure control device includes the corresponding rod and one of a nut or a calibrated mass for applying the constant pressure.

13. A battery system comprising:
   a battery electric device for use with an electric load, comprising:
      an electrochemical battery cell selectively connectable to the electric load and having a cell surface;
      a pair of direct-to-air heat pumps connected to the cell surface of the battery cell such that the battery cell is disposed between the pair of direct-to-air heat pumps;
      a pressure control device configured to apply a constant pressure to the cell surface when the battery cell is connected to the electric load, wherein a connection of the battery cell to the electric load causes each of the heat pumps to pump a quantity of heat from the battery cell in conjunction with the constant pressure; and
      at least one sensor configured to generate an output voltage signal indicative of the quantity of heat; and
   a processor in communication with the battery cell and the electric load, wherein the processor is configured to receive the output voltage signal from the at least one sensor when the battery cell is connected to the electric load, and to generate an electronic control signal in response to the quantity of heat, wherein the processor is configured determine the quantity of heat that is pumped from the battery cell at a calibrated temperature setpoint using the output voltage signal, and to thereafter control an operation of the battery electric device to maintain the calibrated temperature setpoint.

14. The battery system of claim 13, wherein the at least one sensor includes a heat flux sensor, and the quantity of heat includes a measured heat flux from the cell surface.

15. The battery system of claim 13, wherein the electronic control signal initiates a control action, the control action including commanding a powerflow change of the battery cell in response to the quantity of heat and/or commanding a thermal regulation operation of the battery cell in response to the quantity of heat.

16. The battery system of claim 13, wherein the pair of heat pumps includes first and second thermoelectric assemblies (TEAs) each respectively having a solid-state thermoelectric module (TEM), a heat sink, and a fan operable for cooling the solid-state TEM, further comprising:
　　a bipolar power supply that is electrically connected to the TEAs and operable for controlling an operation thereof.

17. The battery system of claim 13, wherein the processor is configured determine the quantity of heat that is pumped from the battery cell as a distribution of a heat generation rate for the battery cell when the battery cell is held under the constant pressure, and to control the operation of the battery electric device to maintain the temperature setpoint in response to the heat generation rate.

18. The battery system of claim 13, wherein each of the heat pumps define a respective through-hole within which is positioned a rod, and wherein the pressure control device includes the rod and one of a nut or a calibrated mass for applying the constant pressure.

19. A method for constructing a battery electric device for use with an electric load, comprising:
　　arranging a plurality of heat flux sensors on a cell surface of an electrochemical battery cell;
　　providing a pair of direct-to-air thermoelectric assemblies (TEAs) each respectively having one or more solid-state thermoelectric modules (TEMs), a fan, a heat sink, and a metal plate, wherein the one or more TEMs are disposed between the heat sink and the metal plate;
　　positioning the battery cell and the plurality of heat flux sensors arranged thereon between the metal plate of each of the pair of direct-to-air TEAs;
　　using a pressure control device to apply a constant pressure to the cell surface when the battery cell is connected to the electric load as the TEAs actively pump a quantity of heat from the battery cell;
　　transmitting to a processor, via the plurality of heat flux sensors, an output voltage signal indicative of the quantity of heat;
　　determining the quantity of heat that is pumped from the battery cell, via the processor, at a calibrated temperature setpoint using the output voltage signal; and
　　controlling an operation of the battery electric device in response to the quantity of heat to maintain the temperature setpoint.

20. The method of claim 19, wherein determining the quantity of heat that is pumped from the battery cell includes determining a distribution of a heat generation rate for the battery cell when the battery cell is held under the constant pressure, and wherein controlling the operation of the battery electric device to maintain the temperature setpoint in response to the heat generation rate.

* * * * *